Jan. 11, 1938.　　　　R. W. DINZL　　　　2,105,215
RUBBER SHEAR
Filed Oct. 1, 1935　　　3 Sheets-Sheet 1
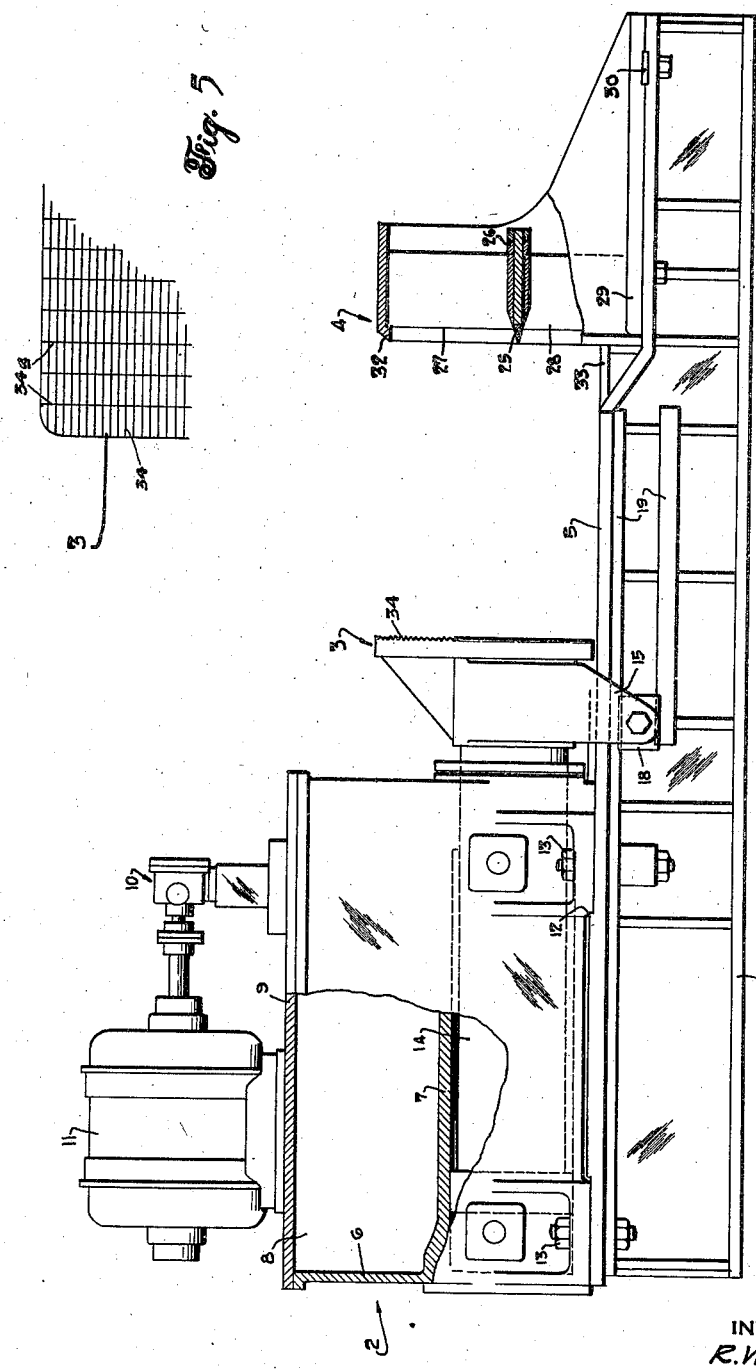
INVENTOR
R.W. Dinzl
BY
ATTORNEY

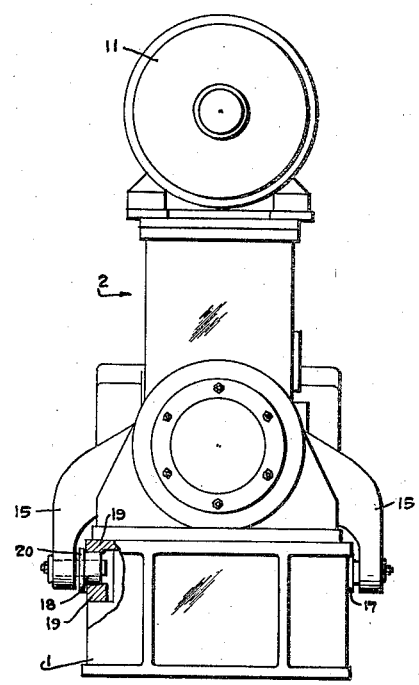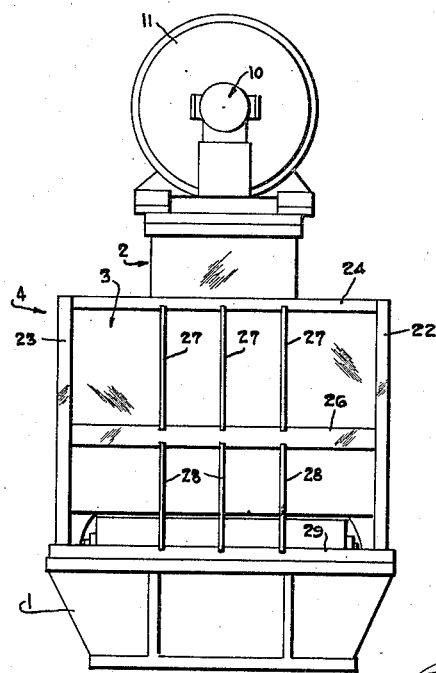

Jan. 11, 1938.                R. W. DINZL                 2,105,215
                              RUBBER SHEAR
                           Filed Oct. 1, 1935              3 Sheets-Sheet 3
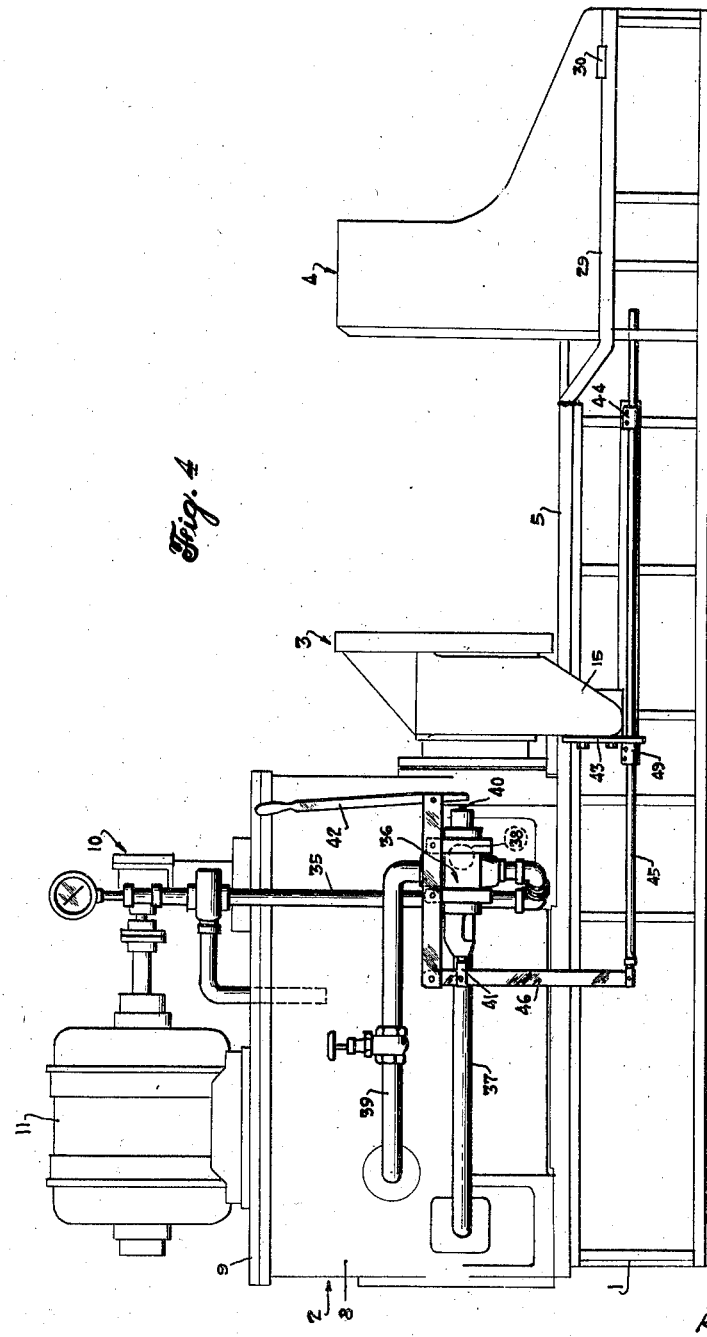
INVENTOR
R. W. Dinzl
BY
ATTORNEY Patented Jan. 11, 1938

2,105,215

UNITED STATES PATENT OFFICE 2,105,215

RUBBER SHEAR

Richard W. Dinzl, Narberth, Pa., assignor to Baldwin-Southwark Corporation, a corporation of Delaware Application October 1, 1935, Serial No. 43,059

8 Claims. (Cl. 164—56)

This invention relates generally to rubber shears and more particularly to an improved hydraulically operated rubber shear for cutting bale rubber.

Crude rubber is usually received from the plantations in bale form generally as a rough rectangular prism of variable dimensions and weighs from 150 to 200 pounds. In order to make such bales acceptable to the first machinery in the process of rubber manufacture, it is necessary to divide the bales into sections of smaller dimensions. This has heretofore been accomplished in various ways including circular and band saws, hydraulic presses having knives with concave cutting edges terminating in a central boss of more or less conical form, the knives radiating therefrom, while single reciprocating knives have also been employed. Such prior devices have not been entirely satisfactory due to their inability to properly cope with well-known peculiar characteristics of a rubber bale during cutting thereof. To overcome certain of these difficulties, it has been proposed to use water as a lubricant for sawing or cutting, but this necessitates removal of the water before further processing to avoid having such water act as a lubricant between the sections of the bale and the rolls of the mill, which makes milling of the crude rubber difficult and the grinding slower. Or if the water is not adequately removed, it may even require the services of a man to feed the pieces to the mill, thus involving an economic objection. Another objection to the prior devices is that oil used with the cutting apparatus has contaminated the bales, thus increasing the difficulties of subsequent processing. The knife and platen arrangements of the prior devices have also had difficulty with bulging of the rubber during compression thereof in the cutting operation with the result that improper or difficult cutting occurs including excessive friction between the knife structure and rubber.

It is an object of my invention to provide an improved rubber bale shear that is not only economical in manufacture, maintenance and operation but also efficiently cuts the rubber, all in a manner that overcomes the various objections of the prior devices. It has been found that rubber shears built in accordance with the disclosure hereof accomplish the foregoing results in a highly desirable and economical manner.

A further object is to accomplish the foregoing results with a machine that is compact and sturdy together with an arrangement that permits maximum accessibility to the bale table and also has improved automatic control of the hydraulically operated platen.

Other objects and advantages will be more apparent to those skilled in the art from the following description of the accompanying drawings in which:

Fig. 1 is a side elevation of my improved rubber shear with part of the operating structure broken away to show details of the combined tank and cylinder for the operating ram, the piping and automatic control means being omitted for clarity;

Fig. 2 is a view of the left end of Fig. 1;

Fig. 3 is a view of the right end of Fig. 1;

Fig. 4 is a partial side elevation of the apparatus for automatically controlling the ram;

Fig. 5 is a partial elevational view of a small portion of the platen face.

In the particular embodiment of the invention which is shown herein merely for the purpose of illustrating one specific form among possible others that the invention might take in practice, I have provided as shown in Fig. 1 a base 1 either cast as an integral unit or built up by welded sections but in either case the base has at one end an operating mechanism generally indicated at 2, a platen 3, a knife structure 4 and a bale table 5.

The operating mechanism 2 is arranged to form a multiplicity of cooperative functions and to that end a preferably cast box 6 is supported upon base 1. The lower portion of this box contains a cylinder 7, thereby forming a sump or chamber 8 which is used for operating fluid. A cover 9 for the box supports a pump 10 and a driving motor 11 therefor. This box in cross-section is substantially rectangular as is apparent from its outline in Fig. 2, thereby providing an extremely sturdy and compact arrangement for the cylinder, oil chamber and motor-pump support. The foregoing self-contained structure is adequately keyed as at 12 to the bed and secured thereto by bolts 13, thereby avoiding the necessity of any tension side rods to take the reaction during operation of the ram.

Disposed within cylinder 7 is a double acting ram 14 extending through a usual packing in the forward end of box 6. Platen 3 is secured in any usual manner on the outer end of ram 14 and has two laterally disposed dependent guide arms 15 overhanging the sides of table 5. The lower ends of each of these arms pivotally support guide blocks 17 and 18 which are slidably supported by upper and lower guide ways 19. Each of the guide blocks has an outer flange 20 engaging the outer edge of each of the upper guide ways 19, thereby preventing lateral movement of platen 3. The guide ways and guide blocks prevent the platen and ram from dropping or sagging as they move to their outermost position toward the adjacent knife structure 4. In addition to the foregoing functions, the location of the guide ways and guiding blocks beneath the table 5 eliminates the necessity for any guide surface on top of the table and thereby avoids the presence or accumulation of lubricant on the table which would directly contaminate a rubber bale supported thereon. Also the location of the guide ways permits a long moment arm between the guiding surfaces and the center of the plunger, thereby insuring the platen face to be maintained more nearly parallel to the plane of the knife edges.

The knife structure 4 comprises parallel sides 22 and 23 and an upper cross piece 24. A horizontal knife 25, Figs. 1 and 3, extends between the sides 22 and 23 and is supported in any suitable cross member 26. A series of vertical knives 27 are interposed between the cross member 24 and the horizontal knife 25 while another series of vertical knives 28 are interposed between horizontal knife 25 and a bottom member 29 to which sides 22 and 23 are connected to complete the box-like knife frame. This frame, however, is open both at its front and rear ends to permit continuous passage of cut rubber therethrough. The knife structure is supported upon the rear end of the main base frame 1 and suitably secured thereto by transverse keys 30 and bolts.

The inner edges of sides 22 and 23 and of cross member 24 are formed as knife edges 32, Fig. 1. The various knives are substantially equal to the longitudinal length of the sides of the frame, thus permitting the knife blades to effectively resist bending when a bale is pressed against the face of the knife edges by platen 3. The table 5, however, extends horizontally as at 33 to meet the knife edges and sides of the frame at a plane appreciably above the bottom member 29.

The face of platen 3 is horizontally serrated by small closely spaced V-cuts generally indicated at 34, while similar but more widely spaced cuts extend vertically as indicated by lines 34a, Fig. 5. The general effect of this arrangement is a series of small approximate diamond-shaped points or pyramids, which grip the rubber bale and hold it against lateral yielding at the platen face. This lateral holding action on the rear side of the rubber bale is very effective in insuring that the bale is maintained in its original cutting relation to the knives substantially throughout the cutting operation without any possibility of side slipping of the bale which would increase friction and also cause an irregular cutting of the bale.

As the bale is pressed forwardly over the knives, it is seen that the lower cut sections of rubbers passing between the lower vertical knives 28, 22 and 23 can expand downwardly after passing the free end of the table extension 33 thereby tending to free the rubber at the horizontal knife edge 25, while any portion of the bale which overhangs the sides or top of the knife structure will be similarly effectively cut due to the knife edges formed on the members 22, 23 and 24.

Any suitable pipe and manually operable valve connections may be provided between the oil sump 8, pump 10 and the two ends of ram-cylinder 7 whereby the ram and platen may be reciprocated as successive bales are placed upon table 5. However, if desired, return movement of the platen may be effected automatically after the forward movement is manually initiated. To this end, I have shown one automatic control and piping therefor in Fig. 4. This comprises a pump discharge pipe 35 adapted for alternative connection through a four-way valve 36 to pipes 37 and 38, connected respectively to the opposite ends of the ram-cylinder, while an exhaust pipe 39 connects the valve to the sump 8. The valve 36 can be of any suitable construction such as having a double end operating stem, one end of which is indicated at 40 and the other at 41. A hand lever 42 is adapted upon clockwise movement to engage the stem 40 and shift the valve so as to admit pump pressure fluid through pipes 35 and 37 to move the ram and platen forwardly while at the same time discharging fluid from the other end of the ram-cylinder through pipes 38 and 39 to the sump. As the ram moves forwardly, it carries an arm 43 therewith for engagement with a forward stop 44 secured to a shifting rod 45, this rod in turn moving arm 46 and valve stem 41 so as to reverse flow of fluid through valve 36 and thus admit pump fluid to the right end of the ram-cylinder, Fig. 1, and discharge fluid from the left end thereof, thus returning the platen to its original position. When the platen reaches this position, arm 43 engages a stop 49 also secured to rod 45 and thus moves the valve to its neutral position so as to be ready for the next cycle of operation.

From the foregoing disclosure, it is seen that I have provided a very effective and yet simple and compact bale rubber shear adapted to cut the rubber without the need of water or other lubricant and with minimum labor and time while at the same time insuring that the rubber is free from contamination.

It will of course be understood that various changes in details of construction and arrangement of parts may be made by those skilled in the art without departing from the spirit of the invention as set forth in the appended claims.

I claim:

1. A rubber shear comprising, in combination, a base, a knife structure supported thereon and having open ends whereby rubber enters one end and is discharged through the other end, a hydraulic ram and cylinder supported by said base, a platen actuated by said ram and movable over a bale table portion of said base located between said knife structure and cylinder, and means located beneath said table for directly and primarily supporting said platen.

2. A rubber shear comprising, in combination, a base having a bale table, a cutting knife structure supported on one end thereof, a ram and cylinder supported on the other end of the base, a platen operated by said ram and having dependent lateral arms overhanging the sides of said base, bearing blocks carried by said arms adjacent said sides, and means disposed below the plane of said bale table for forming guide ways for said bearing blocks thereby to vertically support said platen.

3. A rubber shear comprising, in combination, a base, a knife structure supported on one end of said base and having a plurality of knives whose knife edges are substantially straight throughout their length and lie in a substantially common transverse plane, a hydraulic ram and cylinder supported on the other end of said base, and a platen carried by said ram and provided with means on its face for preventing lateral displacement of a rubber bale during compression thereof against the knife edges, said latter means including a series of transverse and vertical grooves certain of which are crosswise of the knife edges.

4. A rubber shear comprising, in combination, a base, a knife structure having an outer frame with its forward edges formed as knives whereby a rubber bale of larger size than said frame is caused to have its excess material cut by said forward edges and pass over the outside of the frame, and intermediate knife blades supported by said frame within the same, and a hydraulically operated platen movable over said base in opposed relation to said knife structure.

5. The combination set forth in claim 4 further characterized in that said forward edges of the knife frame are tapered outwardly starting substantially at the inner surface of said frame.

6. A rubber shear comprising, in combination, a horizontal base, a platen movable over said base, a knife structure supported on said base in opposed relation to said platen, a ram, and a cylinder therefor supported on said base for moving said platen and having sides projecting outwardly therefrom to form a liquid pump sump and to reinforce said cylinder as the platen forces rubber through said knife structure.

7. A rubber shear comprising, in combination, a horizontal base, a platen movable over said base, a knife structure supported on said base in opposed relation to said platen, a ram, a cylinder supported on said base for moving said platen and having sides projecting outwardly therefrom to form a liquid pump sump, and a motor-pump unit supported by said sump structure for pumping fluid from said sump and to reinforce said cylinder as the platen forces rubber through said knife structure to said cylinder.

8. A rubber shear comprising, in combination, a horizontal base, a platen movable over said base, a knife structure supported on said base in opposed relation to said platen, a ram, a cylinder supported on said base for moving said platen and having sides projecting upwardly therefrom to form a liquid pump sump, a cover supported on the top of said sides, and a motor-pump unit supported on said cover for pumping liquid from said sump and to reinforce said cylinder as the platen forces rubber through said knife structure to said cylinder.

RICHARD W. DINZL.

CERTIFICATE OF CORRECTION.

Patent No. 2,105,215.  January 11, 1938.

RICHARD W. DINZL.

It is hereby certified that error appears in the printed specification of the above numbered patent requiring correction as follows: Page 3, second column, lines 11, 12 and 13 and lines 23, 24 and 25, claims 7 and 8 respectively, strike out the words "and to reinforce said cylinder as the platen forces rubber through said knife structure" and insert the same after "sump" and before the comma in lines 9 and 20 respectively, same claims; and that the said Letters Patent should be read with these corrections therein that the same may conform to the record of the case in the Patent Office.

Signed and sealed this 10th day of May, A. D. 1938.

Henry Van Arsdale,
Acting Commissioner of Patents.

(Seal)